F. A. SUTHERLAND.
WRAPPING MACHINE.
APPLICATION FILED NOV. 13, 1917.

1,351,809.

Patented Sept. 7, 1920.
5 SHEETS—SHEET 1.

INVENTOR
Forrest A. Sutherland,
By his attorneys,
McDermott & McCready.

F. A. SUTHERLAND.
WRAPPING MACHINE.
APPLICATION FILED NOV. 13, 1917.

1,351,809.

Patented Sept. 7, 1920.
5 SHEETS—SHEET 3.

INVENTOR
Forrest A. Sutherland,
By his attorneys,
McDermott + McCready

F. A. SUTHERLAND.
WRAPPING MACHINE.
APPLICATION FILED NOV. 13, 1917.

1,351,809.

Patented Sept. 7, 1920.
5 SHEETS—SHEET 5.

INVENTOR
Forrest A. Sutherland.
By his attorneys,
McDermott & McCready.

UNITED STATES PATENT OFFICE.

FORREST A. SUTHERLAND, OF MILLINOCKET, MAINE, ASSIGNOR TO GREAT NORTHERN PAPER COMPANY, OF MILLINOCKET, MAINE, A CORPORATION OF MAINE.

WRAPPING-MACHINE.

1,351,809.   Specification of Letters Patent.   Patented Sept. 7, 1920.

Application filed November 13, 1917. Serial No. 201,863.

*To all whom it may concern:*

Be it known that I, FORREST A. SUTHERLAND, a citizen of the United States, residing at Millinocket, in the county of Penobscot and State of Maine, have invented certain Improvements in Wrapping-Machines, of which the following description, in connection with the accompanying drawings, is a specification, like reference characters on the drawings indicating like parts in the several figures.

This invention relates to wrapping machines and is concerned particularly with the wrapping of large rolls of paper as they come from a paper making machine preparatory to shipping them.

It is the usual practice at the present time to wrap these rolls of paper by hand, and the process involves the rolling of one of these rolls into one or more wrappers of a size sufficient to form the required number of layers around the roll and provide tubular wrapper extensions projecting beyond the opposite ends of the roll. These extensions are then crimped or folded down against the opposite end faces of the roll and are secured by a large end seal or header that is pasted over the folded ends. It is usually customary also to cover the opposite ends of the roll with an inside header before the crimping operations are performed so as to prevent paste or adhesive material from coming in direct contact with the ends of the roll.

The present invention has for its general object to devise a machine that will automatically wrap rolls of paper of this character.

The various features of the invention will be readily understood from the following description when read in connection with the accompanying drawings and will be pointed out more particularly in the appended claims.

Referring now to the drawings.

Figure 12:
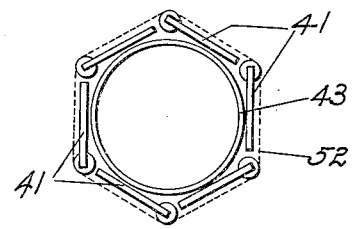
Figure 10:
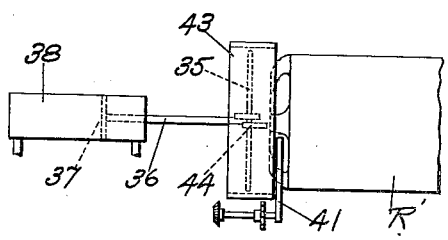
Figure 13:
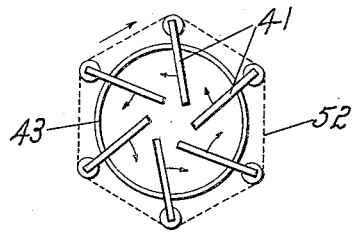
Figure 14:
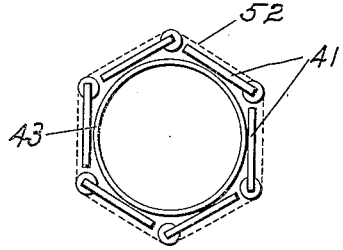
Figure 15:
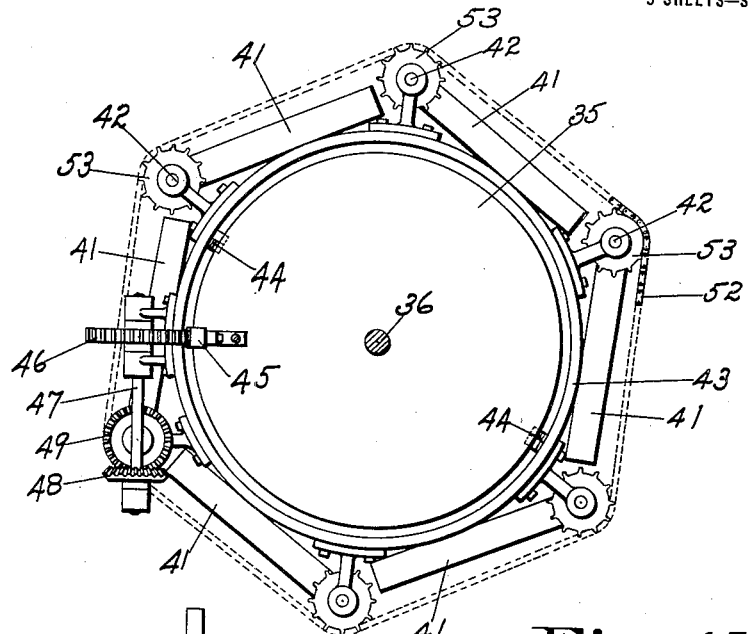
Figure 16:
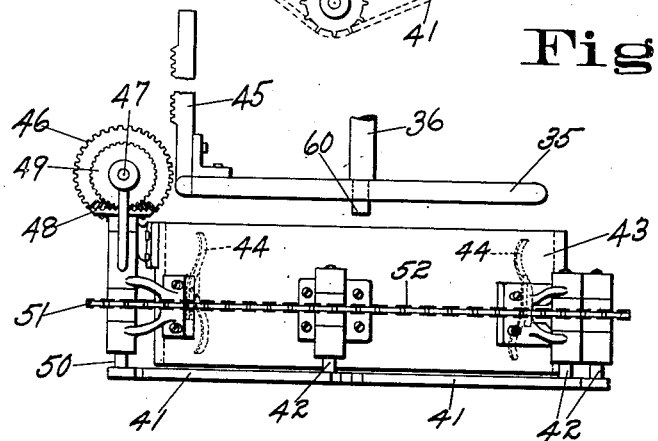

Figs. 7 to 11, inclusive, are side views, largely diagrammatic, of the end wrapping mechanism showing successive steps in the operation of crimping the ends of the wrapper and applying headers thereto;

Figs. 12, 13 and 14 are end views of the crimping mechanism showing successive steps in the crimping operation;

Fig. 15 is a rear elevation of the crimping mechanism;

Fig. 16 is a plan view of the mechanism shown in Fig. 15; and

Figure 17:
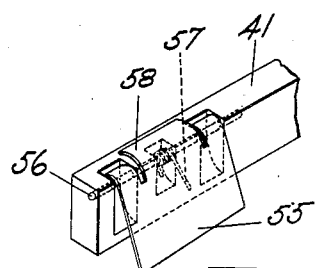

Fig. 17 is an angular view showing certain details of one of the crimpers or end folders.

Briefly stated, the machine shown comprises a feeding mechanism for delivering the rolls one at a time to the wrapping mechanism, a body wrapping mechanism that operates to cover the peripheral surface of a roll with wrapping material leaving tubular wrapper extensions projecting beyond the opposite ends of the roll, a mechanism that ejects the roll from the wrapping mechanism and effects its delivery to an end wrapping mechanism which crimps the wrapper extensions at the opposite ends of the roll and presses headers against them, and a mechanism that ejects the wrapped roll from the machine. The machine also includes mechanisms for feeding the wrapping material to the wrapping mechanism in the form of a continuous strip, applying adhesive thereto and severing the strip to form wrapper sheets of the required length. The detailed description of the several mechanisms of the machine will be taken up in substantially the order in which they have just been mentioned.

Figure 1:
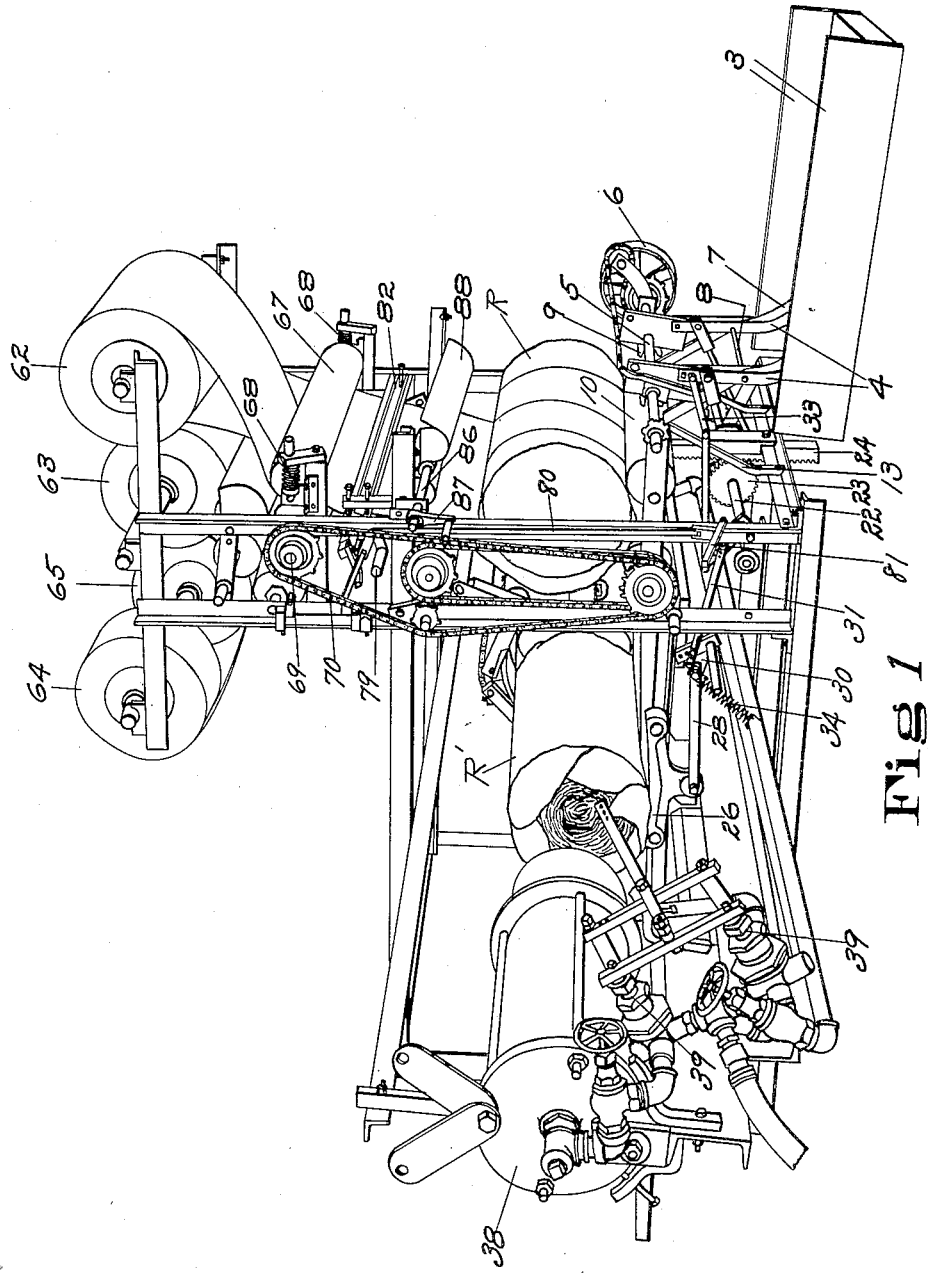
Figure 1 is an angular view of a wrapping machine embodying this invention and showing it in the act of wrapping rolls of paper, certain parts of the machine having been removed for the purpose of more clearly illustrating other parts of the machine.
Figure 2:
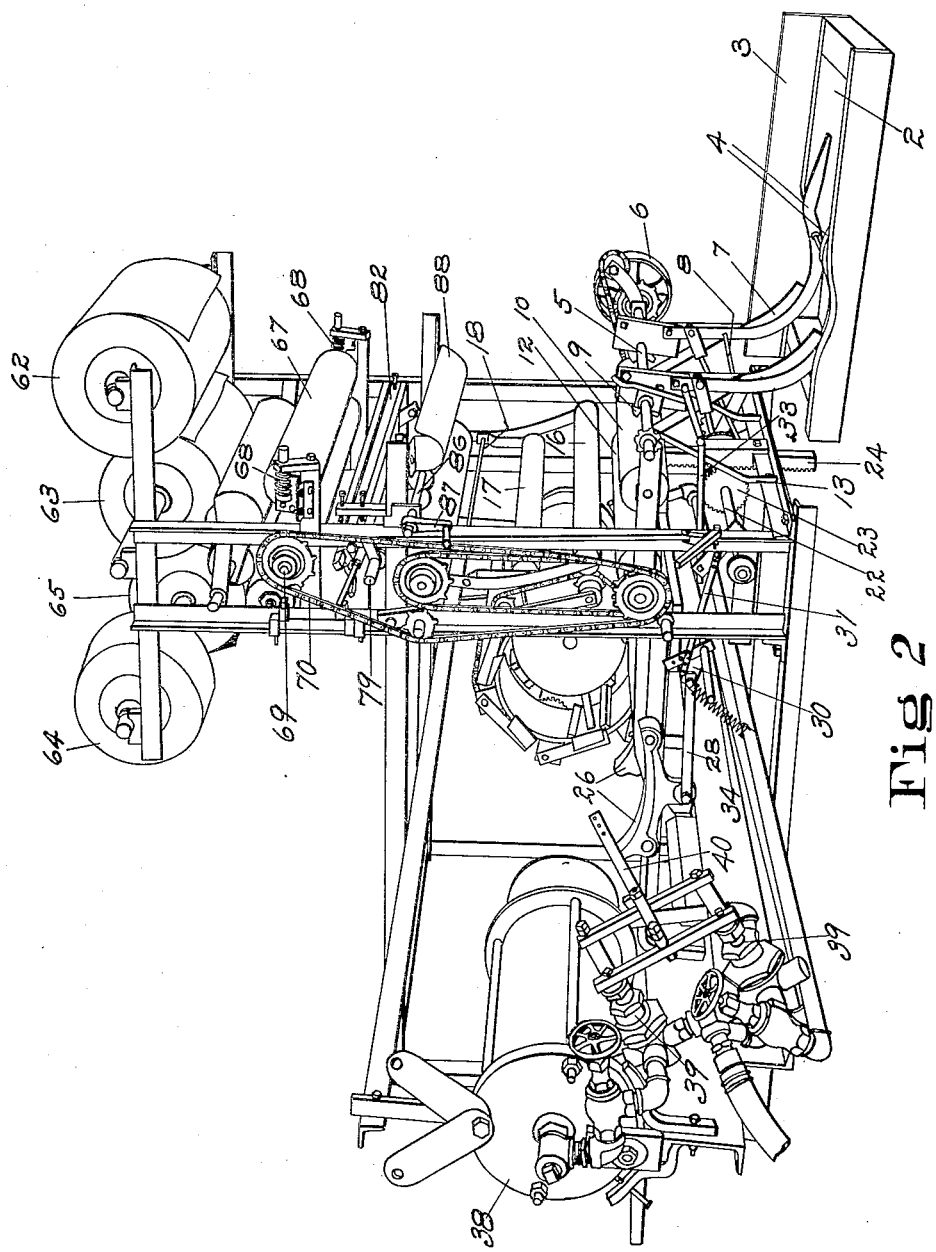
Fig. 2 is a view similar to Fig. 1 but showing no rolls in the machine.
Figure 5:
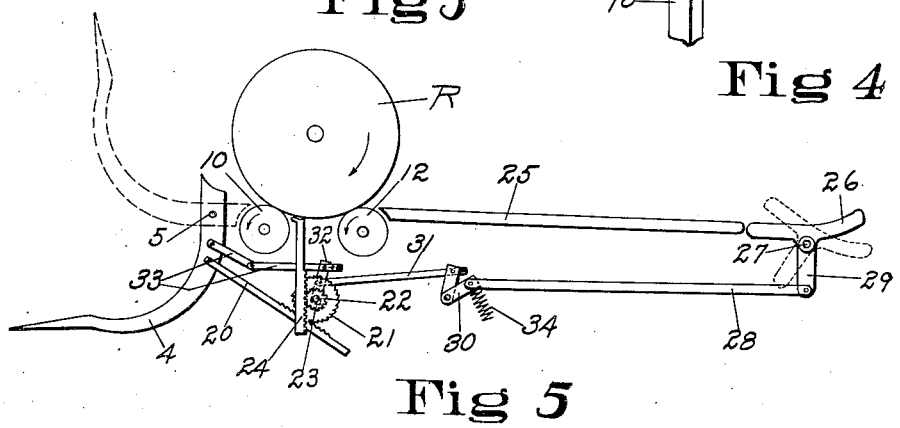
Fig. 5 is a diagrammatic view showing the mechanism for feeding the rolls to the wrapping mechanism and transferring them from one part of the machine to another.
Figure 6:
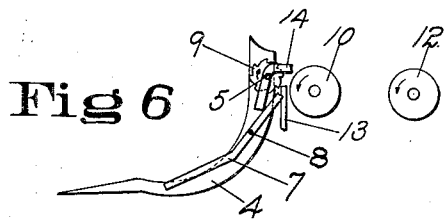
Fig. 6 is a diagrammatic view showing the mechanism for controlling the roll feeding mechanism of the machine.

The rolls of paper to be wrapped are rolled into the machine on suitable ways 2, between guides 3 that center the roll properly in the machine, and come to rest on a feeder that consists of a pair of arms 4 curved to form a pocket or depression into which one of the rolls can fit. Both of these arms are pivoted on a shaft 5 and they normally rest in their roll-receiving position in which they are shown in Fig. 1, 2 and 5. The shaft 5 is constantly rotated by a pulley 6 which is driven from any convenient source of power. The act of positioning a roll on the feeder 4 operates through a feeler or trip mechanism to connect the feeder to the driven shaft 5 and cause the feeder to rotate with the shaft. For this purpose two arms 7 are pivoted at 8 to the feeder arms 4 and the pressure of a roll against the arms 7 moves the rearward ends of these members into engagement, respectively, with two toothed wheels 9 fixed on the shaft 5. This arrangement is best shown in Fig. 6. As the shaft continues to rotate, the engagement of the toothed wheels 9 with the arms 7 compels the feeder 4 to rotate with the shaft 5, and this rotative movement carries the feeder from the position in which it is shown in full lines in Fig. 5 into that in which it appears in dotted lines in said figure. In the latter position the shanks of the arms 4 are nearly horizontal but are slightly tipped toward the rolls 10 and 12, which form part of the wrapping mechanism, and consequently the roll R rolls off the arms on to the rolls 10 and 12 and rests in the position in which it is shown in Figs. 1 and 5.

This operation completes the delivery of the roll to the wrapping mechanism. It is now desirable to trip the feeder 4 and return it to its former position, and for this purpose two stationary stops 13, one of which is indicated in Fig. 6, are positioned to engage the ends of two bell crank levers 14 which are pivoted on the shaft 5 and are turned on the shaft by their engagement with the rearward ends of the respective arms 7. When their rotative movement is stopped by engagement with the stationary members 13, the continued rotation of the feeder 4 causes the bell crank levers 14 to pry the arms 7 out of engagement with the teeth of the wheels 9, whereupon the feeder and the parts carried thereby immediately drop back to their initial position as shown in Figs. 1, 2 and 6.

The wrapper feeding mechanism, which may be of any suitable type, is located above the mechanism that rolls the wrapper about the roll and delivers the wrapping material to the wrapping mechanism in the form of a continuous strip or, more accurately, in the form of a plurality of continuous strips which are overlapped to form the wrapper. The drawings show the machine arranged to supply two main wrappers, which are overlapped in the middle and are of such a width that they form a continuous strip greater in width than the length of the roll, and also to deliver two narrow strips that reinforce the wrapper at the ends of the roll. This wrapping material is brought downwardly between suitable guides, the end resting in position to be engaged by the roll R when it is delivered to the two rolls 10 and 12.

The rear roll 12 is positively driven by chain connections between the shaft 15 on which it is mounted and the shaft 5, but rotates oppositely to the direction of rotation of the shaft 5. The roll 10 is idle. Usually a strip of paste is applied to the leading edge of the wrapper so that it will adhere to the periphery of the roll. The roll R immediately begins to rotate through its engagement with the roll 12 and this action causes it to wind the wrapping material around itself, this material being advanced to the roll at the proper rate by the feeding mechanism. The wrapper is held in engagement with the roll adjacent to the point at which it first comes in engagement with it by means of two guide rolls 16 and 17, Figs. 2 and 3, both carried by arms that swing freely on the rod 18. These rolls are so mounted, as will be evident from an inspection of Fig. 3, that they tend to swing toward the roll R that is being wrapped and thus press the wrapper against the peripheral surface of the roll. When the required number of layers has been wound on the roll the operator throws a cutting mechanism into operation which severs the wrapper, and the trailing end of the wrapper is then coated with adhesive material to secure it to the next adjacent layer of wrapping material on the roll.

The peripheral surface of the roll has now been covered with the required number of layers of wrapping material and since, as above state, the wrapper is longer than the roll, this operation forms a tubular wrapper extension projecting several inches beyond each end of the roll. The roll is next transferred to another station where the end wrapping operations are performed. For the purpose of effecting this transfer a mechanism is provided that ejects the roll R from the body wrapping mechanism simultaneously with the delivery to said mechanism of another roll. As best shown in Fig. 5, this ejecting mechanism comprises a toothed bar 20 pivoted to the feeder 4 and provided with teeth that mesh with a toothed wheel 21 mounted to rotate on a shaft 22. A pinion 23 fast on the shaft 22 meshes with a rack 24 which is mounted to slide vertically in suitable ways. The upper end of this rack engages the roll R between the rolls 10 and 12, forward of the center of the roll R, and tips the roll over the roll 12 on to ways 25 which are slightly inclined and down which the roll runs into engagement with a rocking cradle 26. This cradle is normally stationary and holds the roll in a stationary position while the end wrapping operations are being performed on it, but it is tipped to eject the roll from the machine after these wrapping operations have been completed. For this purpose the cradle is pivoted at 27, Fig. 5, and is connected with the feeder 4 so that the delivering movement of the feeder tips the cradle 26 to cause it to eject a roll positioned thereon. These connections include a link 28, pivoted at one end to an extension 29 of the cradle 26 and at its opposite end to one arm of the bell crank lever 30, the other arm of said lever being connected by a link 31 to a lever 32 fulcrumed on the shaft 22 and arranged to be rocked by a jointed link 33 that connects it to the feeder 4. It will now be understood that the ejecting mechanism for both the body wrapping means and the end wrapping means are not only controlled by the feeder 4, but are actuated by connections with the feeder. These connections are timed to cause a roll to be ejected from each wrapping mechanism before the next succeeding roll is delivered to it.

The return of the feeder 4 to its normal position rocks the cradle 26 back to its horizontal or normal position and this movement is aided by the spring 34, Fig. 5. The rack 24 is returned to its normal position immediately after ejecting the roll from the body wrapping mechanism by the disengagement of the teeth on the bar 20 from the wheel 21. That is, the bar is toothed for only such a portion of its length that before the feeder has reached its uppermost position a smooth part of the bar comes into engagement with the toothed wheel 21, thus interrupting the driving connection between this bar and the wheel 21. The weight of the rack 24 immediately begins to rotate the pinion 22 and toothed wheel 21 in a reverse direction and this motion continues until the rack 24 reaches the lower limit of its movement. This device thus completes its roll-ejecting movement and retires to its inoperative position before the feeder 4 has had time to deliver a roll to the wrapping mechanism.

The inside headers consist of circular disks of paper nearly as large in diameter as the ends of the roll and they may be placed in position by the attendants either while the roll is in the body wrapping mechanism or after it has been delivered to the end wrapping mechanism. Fig. 1 shows the roll R with the inside headers in position but shows the roll R' without the inside headers for the purpose of illustrating the end folding operation more clearly.

Figure 9:
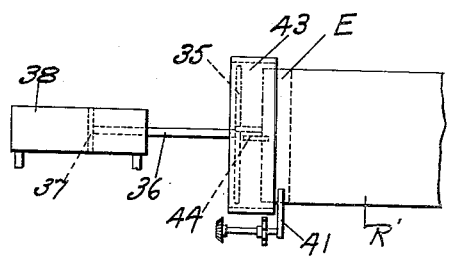

In the machine shown the end folding mechanism is arranged to be pneumatically operated. The mechanism for operating at one end of the roll is a duplicate of that which operates at the opposite end and accordingly one of these mechanisms only need be described in detail. In Figs. 1 and 2 the nearer end folding mechanism has been dismantled for the sake of more clearly illustrating other parts of the machine. Referring particularly to Figs. 7 to 17, it will be seen that each of these mechanisms comprises a plunger 35 mounted on the end of a piston rod 36 having a piston 37 fixed to it and arranged to slide in a cylinder 38. Compressed air or other fluid under pressure is utilized to move the piston 37 back and forth in the cylinder 38, the flow of this fluid into and out of the cylinder being controlled by suitable valves 39, Fig. 2, arranged to be operated by a lever 40. When a roll is delivered to the cradle 26 both of the end wrapping mechanisms are withdrawn into their inoperative positions. Accordingly these mechanisms are first advanced into operative relationship to the roll. Each of these mechanisms includes an end folding or crimping mechanism which comprises a series of folders 41 each mounted to swing on a shaft 42. This folding mechanism is mounted on a head 43 which consists of a short cylinder, larger in diameter than either the roll R or the plunger 35. This head is mounted to slide back and forth on suitable ways toward and from the end of the roll R', its range of motion being limited by suitable stops. As the plunger 35 is moved forward and enters the head 43, its edge engages two sets of springs 44 mounted at diametrically opposite points in the head, see Figs. 15 and 16. The resistance of these springs is sufficient to enable the plunger 35 to carry the head 43 forward with it to the extreme forward limit of its stroke. At this time the head is in the position in which it is shown in Fig. 9, where it encircles the end extensions E of the wrapper. Since all of the parts of the crimping mechanism are mounted on the head 43, this movement places the crimping mechanism in its operative position with reference to the roll.

The plunger 35 carries a rack 45 which begins to mesh with a gear 46 just after the head 43 has completed its forward movement. The motion thus imparted to the gear is transmitted through a shaft 47 and bevel gears 48 and 49 to a shaft 50 lying parallel with the axis of the head 43 and to which one of the folders 41 is fixed. This shaft carries a sprocket wheel 51 over which runs a chain 52 that meshes with sprocket wheels 53 fast on each of the shafts 42 that carry the folders 41. Consequently the continued forward movement of the plunger operates through this mechanism to swing all the folders 41 simultaneously across the end face of the roll from the positions in which they are shown in Fig. 12 to those in which they are shown in Fig. 14, the direction of motion being indicated by the arrows in Fig. 13. It will be noted that the folders are so short that they do not reach to the center of the end face of the roll and it will be evident from an inspection of Figs. 9 and 14 that the described movement of the members 41 causes them to make a series of folds in the end extension E and to press the folds so made against the end face of the roll. In order to compensate for slight differences in the relative positions of the end face of the roll and the folding mechanism, each of the folders is provided with a spring pressed wing 55, Fig. 17, which is pivoted on a rod 56 that extends longitudinally of the folder and its free end is held outwardly by means of a spring 57. The movement of the wing under the influence of this spring is limited, however, by a tail piece 58 formed on the wing.

Figure 11:
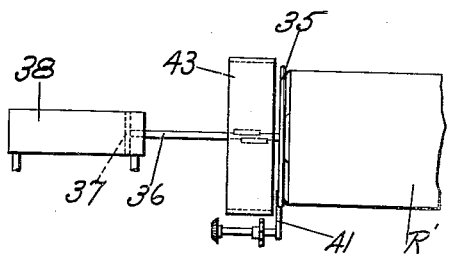

It will be understood that the operative movement of the folders takes place while the plunger 35 is moving from the position in which it is shown in Fig. 9 to that in which it is shown in Fig. 11. Consequently by the time the folders have completed their swinging movement, which enables them to perform their folding function, the plunger 35 has moved very nearly into the plane of movement of the folders. In fact, the folders get out of the way just in time to allow the plunger to proceed without striking them. The plunger thus engages the folds made by the members 41 before they have had any opportunity to unfold or straighten out.

The headers that are applied to the opposite ends of the rolls consist merely of large disks of paper. A stack of these disks is mounted on an extension 60, Fig. 16, of the piston rod 36, and before the plunger completes its forward movement the attendant coats the foremost header in the stack with paste. The plunger holds the headers in position for application to the roll and as it moves forward it presses this pasted header into contact with the folds at the end of the roll and holds it there until the adhesive has set sufficiently to secure the header in place.

Figure 7:
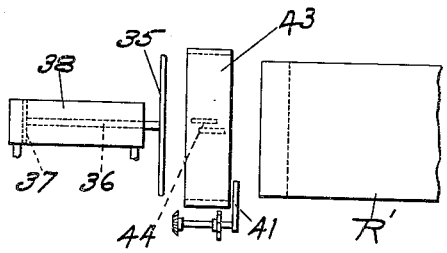
Figure 8:
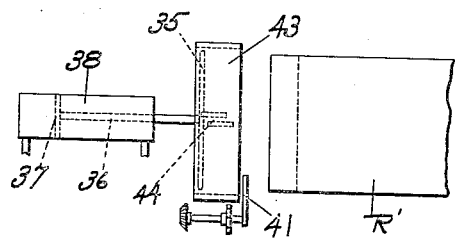

When the movement of the plunger 35 is reversed, it first retires into the head 43 and engages the forward ends of the springs 44. As it continues to withdraw it carries the head 43, and the folding mechanism mounted thereon, backward with it until the head reaches the backward limit of its movement. During this movement the folders are not actuated because there is no relative movement between the rack 45 and the pinion 46. As soon, however, as the head reaches the backward limit of its movement, the springs 44 yield and the plunger 35 continues to retire, moving relatively to the head, and thus operating through the rack 45 and the connections with the folders 41 to return these folders to their original positions in which they are shown in Fig. 12. The plunger 35 continues its retiring movement until it has reached substantially the position in which it is shown in Fig. 7. The completely wrapped roll can be dumped by the cradle 26 at any time after the plungers 35 have begun to withdraw. The ejected roll runs down a suitable runway leading away from the machine.

It will be noted that the rolls of paper are wound on a hollow core and that the extension 60 of the piston rod extends into the hole in the core while the plunger 35 is pressing the header against the end of the roll.

The wrapper feeding mechanism may be of any suitable type and the particular construction employed will depend upon the requirements of individual cases, the preferences of the manufacturer, and similar conditions.

In the construction shown the main wrapper, as above stated, is in two pieces which are supplied from rolls 62 and 63. The reinforcing strips at the ends of the roll are supplied from rolls 64 and 65. The strips from all of these rolls run between, and are fed forward by, two feed rolls 66 and 67, the former roll being driven while the latter runs idly. The roll 67 is forced toward the other roll yieldingly by springs 68. The shaft 69, Fig. 1, of the roll 66 is driven by a chain 70 which runs over sprocket wheels, one on the shaft 69 and the other on the shaft that carries the roll 12. A clutch, which may be of any suitable form, is mounted between the shaft 69 and the sprocket wheel thereon and is arranged to be operated by a hand lever, so that the operation of the paper feeding mechanism is always under the control of the attendant.

Figure 3:
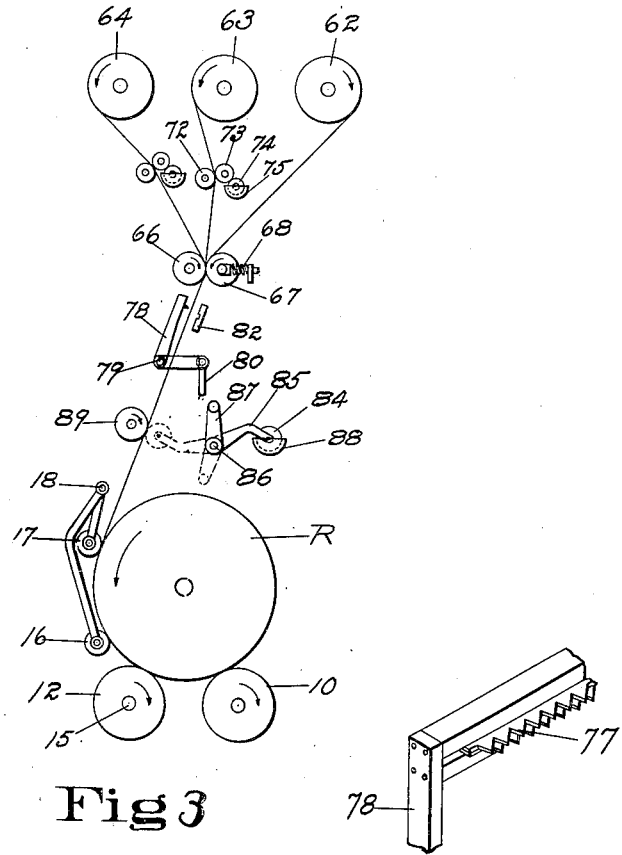
Fig. 3 is a diagrammatic view illustrating the mechanisms for feeding, pasting and cutting the wrapping material.
Figure 4:
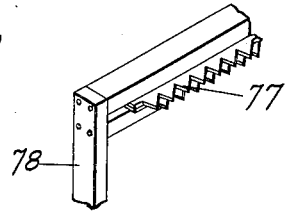
Fig. 4 is an angular view of part of the cutting mechanism.

It is desirable to apply paste between the overlapping portions of the wrappers in order to secure them together. For this purpose the wrapper strip supplied from the roll 63, Fig. 3, is run over a guide roll 72 revolving on a stationary axis and a paste applying roll 73 runs in contact with the opposite face of the paper and also in contact with another roll 74 which rotates in a paste pot 75. This mechanism applies a strip of adhesive of the required width to the portion of the wrapper which later is overlapped by the wrapper strip supplied from the roll 62. A similar paste applying mechanism is provided to apply paste to the end bands supplied from the rolls 64 and 65. All of these paste applying mechanisms may be driven by suitable connections with the shaft 69.

A manually operated cutter is provided to sever the strip of wrapping material below the feed rolls 66 and 67 when the desired number of turns have been wound on the roll R. This cutter consists of a knife or cutter bar 77 carried by a lever 78 which is fulcrumed on a rock shaft 79. An arm fixed to this rock shaft is pivotally connected to the upper end of a long link 80, Fig. 1, that is arranged to be operated by a hand lever 81. When this lever is depressed it swings the knife 77 into engagement with the strip of wrapping material and severs this strip, entering a notch formed in a bar 82 which backs up the strip during the cutting operation. The clutch that controls the driving connection between the chain 70 and the shaft 69 of the paper feeding mechanism is also connected to the link 80, so that the movement of the lever 81 to actuate the cutter also throws out the clutch and stops the wrapper feeding operation. A movement of the lever in the reverse direction swings the knife back into its inoperative position and throws in the clutch again.

In order to apply a strip of paste to the trailing end of the wrapper after it has been severed for the purpose of securing it on the roll, a paste applying roll 84 is mounted between two arms 85, both fixed in a rock shaft 86. A handle 87 is fastened to the rock shaft and enables the attendant to move the paste roll from the position in which it is shown in full lines in Fig. 3, and in which it dips into a paste pot 88, to the position in which it is shown in dotted lines in said figure, where it applies paste to the wrapper. The roll 89 backs up the wrapper during the engagement therewith of the paste applying roll 84. When the desired strip of paste has been applied the roll is returned to the paste trough 88. This mechanism may also be utilized to apply a strip of paste to the leading edge of the wrapper when that is desired for the purpose of initiating the winding operation. It is obvious that if desired these paper feeding, cutting and pasting operations could be performed automatically and that, as above stated, the construction of the mechanism employed to handle the wrapping material will vary with the conditions which the machine is constructed to fulfil. For instance, in wrapping short rolls of paper the wrapper usually is supplied in a single strip instead of in a two piece strip, as in the construction shown. Sometimes also the end bands are omitted. The particular form of wrapper handling mechanism employed therefore does not form an essential part of the present invention, the invention being directed more particularly to the mechanisms that perform the wrapping operations and the mechanisms that handle the roll and present it to and take it away from the wrapping mechanisms. It will also be understood that the invention is not limited to embodiment in the form shown but that this embodiment may be variously modified within the skill of the mechanic and the discretion of the designer without departing from the spirit or scope of the invention.

What I claim as new is:

1. A machine for wrapping rolls of paper, having, in combination, wrapping mechanism for said rolls, and mechanism for feeding said rolls to said wrapping mechanism constructed and arranged to be set into operation by the presence of one of said rolls in position to be fed thereby.

2. A machine for wrapping rolls of paper, having, in combination, wrapping mechanism for said rolls, and mechanism for feeding said rolls to said wrapping mechanism constructed and arranged to be set into operation by the engagement therewith of a roll positioned to be fed thereby.

3. A machine for wrapping rolls of paper, having, in combination, wrapping mechanism for said rolls, a feeder constructed and arranged to elevate said rolls one at a time and deliver them to said wrapping mechanism, power driven mechanism normally disconnected from said feeder for operating the feeder, and a feeler arranged to be operated by the presentation of a roll to said feeder to connect said feeder to said operating mechanism.

4. A machine for wrapping rolls of paper, having, in combination, wrapping mechanism for said rolls, a feeder constructed and arranged to elevate said rolls one at a time and deliver them to said wrapping mechanism, power driven mechanism normally disconnected from said feeder for operating the feeder, and a feeler arranged to be operated by the presentation of a roll to said feeder to connect said feeder to said operating mechanism, and means for automatically disconnecting said feeder from said mechanism when it has completed its feeding operation.

5. A machine for wrapping rolls of paper, having, in combination, body wrapping mechanism, end wrapping means, a feeder for delivering rolls to be wrapped one at a time to said body wrapping mechanism, and means for transferring the rolls from said body wrapping mechanism to said end wrapping means comprising mechanism constructed and arranged to be operated by the movement of said feeder to eject a partially wrapped roll from said body wrapping mechanism.

6. A machine for wrapping rolls of paper, having, in combination, body wrapping mechanism, end wrapping means, a feeder for delivering rolls to be wrapped one at a time to said body wrapping mechanism, mechanism for ejecting a partially wrapped roll from said body wrapping mechanism and moving it toward said end wrapping means, and mechanism for ejecting a roll from said end wrapping means, both of said ejecting mechanisms being controlled by said feeder.

7. A machine for wrapping rolls of paper, having, in combination, body wrapping mechanism, end wrapping means, a feeder for delivering rolls to be wrapped one at a time to said body wrapping mechanism, mechanism for ejecting a partially wrapped roll from said body wrapping mechanism and moving it toward said end wrapping means, mechanism for ejecting a roll from said end wrapping means, and connections between said feeder and both of said ejecting mechanisms for causing the movement of said feeder to operate said ejecting mechanisms.

8. A machine for wrapping rolls of paper, having, in combination, wrapping mechanism for said rolls, feeding mechanism for the rolls constructed and arranged to lift them from a position below the plane of said wrapping mechanism and deliver them one at a time to said wrapping mechanism, and means for ejecting the rolls from said mechanism after it has completed its operation on them.

9. A machine for wrapping rolls of paper, having, in combination, wrapping mechanism constructed to cover the peripheral surface of a roll with a wrapper leaving tubular wrapper extensions projecting beyond the opposite ends of the roll, additional means located at one side of said mechanism for folding said end extensions against the opposite end faces of the roll and applying headers to said folded ends, and means for transferring the roll from said mechanism to said means.

10. A machine for wrapping rolls of paper, having, in combination, wrapping mechanism constructed to cover the peripheral surface of a roll with a wrapper leaving tubular wrapper extensions projecting beyond the opposite ends of the roll, means for moving a roll so wrapped away from said mechanism, and additional means arranged to operate on the roll after its removal from said mechanism to crimp said end extensions and apply headers to the opposite ends of the roll.

11. A machine for wrapping rolls of paper, having, in combination, wrapping mechanism constructed to cover the peripheral surface of a roll with a wrapper while retaining the roll against transferring movement, said mechanism being operative to form tubular wrapper extensions projecting beyond the opposite ends of the roll, additional means for folding said extensions against the opposite end faces of the roll while the roll is held in a stationary position, and mechanism constructed and arranged to effect the transfer of said roll from said wrapping mechanism to said folding means.

12. A machine for wrapping rolls of paper, having, in combination, wrapping mechanism constructed to cover the peripheral surface of a roll with a wrapper leaving tubular wrapper extensions projecting beyond the opposite ends of the roll, mechanism for folding said end extensions against the opposite end faces of the roll, and means for applying headers to said folded ends, said means including plungers for pressing the headers against the ends of the roll, mechanism for moving said plungers, and connections for causing the movement of said plungers to operate said folding mechanism.

13. In a machine for wrapping rolls of paper, an end crimping mechanism comprising a series of folders mounted to swing in a plane substantially parallel to the end face of the roll being wrapped and in a path different from that of the other folders of the series, and mechanism for swinging said folders simultaneously.

14. A machine for wrapping rolls of paper, having, in combination, wrapping mechanism constructed to cover the peripheral surface of a roll with a wrapper leaving tubular wrapper extensions projecting beyond the opposite ends of the roll, mechanism for folding said end extensions in overlapping folds against the opposite end faces of the roll while the roll is held in a stationary position, and means operative to position headers in contact with and press them against said folded ends.

15. A machine for wrapping rolls of paper, having, in combination, mechanism for covering the peripheral surface of a roll with a wrapper leaving tubular wrapper extensions projecting beyond the opposite ends of the roll, means for feeding wrapping material to said mechanism, and mechanism for folding said extensions against the opposite end faces of the roll comprising two circular series of folders normally spaced apart far enough to admit the roll and said extensions between them, mechanism constructed and arranged to move said series of folders toward each other into position to operate on said end extensions, and means for operating said folders to cause them to dispose said end extensions against the end faces of the roll in overlapping folds.

16. In a machine for wrapping rolls of paper, a mechanism for folding a tubular wrapper extension projecting beyond the end of the roll against the end face of the roll comprising a circular series of folders arranged to embrace said extension, and mechanism for swinging said folders past the end face of the roll in paths substantially parallel to the end face of the roll to cause them to perform their folding operations on said end extension, each of said folders moving in a path different from that of the other folders of the series.

17. A machine for wrapping rolls of paper, having, in combination, wrapping mechanism operative to roll a wrapper about one of said rolls of paper, while the roll is supported in a horizontal position and is held against transferring movement, feeding mechanism operative to deliver said rolls one at a time to said mechanism, a wrapper feeding mechanism positioned above said wrapping mechanism and arranged to feed the wrapping material downwardly to said wrapping mechanism, and wrapper engaging means constructed to guide said wrapping material into contact with a roll positioned in said wrapping mechanism and operative to hold said material in engagement with the roll while the wrapping operation is being performed.

18. A machine for wrapping rolls of paper, having, in combination, wrapping mechanism constructed to cover the peripheral surface of a roll with a wrapper while the roll is held against transferring movement, said mechanism being operative to form tubular wrapper extensions projecting beyond the opposite ends of the roll, folding mechanism operative to fold said end extensions against the opposite end faces of a roll simultaneously with the wrapping of another roll by said wrapping mechanism, and means for effecting the transfer of a roll from said wrapping mechanism to said folding mechanism.

In testimony whereof I have signed my name to this specification.

FORREST A. SUTHERLAND.